UNITED STATES PATENT OFFICE 2,240,393

WATER-GLASS CEMENT POWDER AND THE PREPARATION OF CEMENT MORTAR THEREFROM

Karl Dietz, Cronberg in Taunus, Germany, assignor, by mesne assignments, to Pen-Chlor, Incorporated, Philadelphia, Pa., a corporation of Delaware No Drawing. Application February 4, 1939, Serial No. 254,598. In Germany January 17, 1938

10 Claims. (Cl. 106—30)

The present invention relates to water-glass cement powders and the preparation of cement mortars therefrom.

For acid-proof constructions there have recently been used self-hardening water-glass cement masses containing the necessary water-glass in a pulverulent form, so that for use the mass had only to be mixed with water. Besides acid resistant filling agents these masses contained additional substances capable of reacting with alkalies. These cements not only have to resist acid but must also be stable to water, since they are often subject to attack not only by strong acids but also by dilute acids and water. In order to attain this resistance the hardened cements were formerly after-treated with strong acids.

According to the present invention self-hardening acid-proof water-glass cement masses completely resistant to water may be made by increasing the proportion of the constituents in the cement powder which are capable of reacting with alkalies and cause the cement mortar to harden, to such an extent that the made-up cement is "super-acidified." It follows that the amount of substances capable of reacting with alkalies must be greater than that which corresponds to the quantity of alkali liberated by hydrolysis of the water-glass during the making-up of the cement. The excess of these substances preferably exceeds the calculated quantity by at least 25 per cent.

Cement powders containing alkali silicates in a pulverulent form, in which the ratio of $SiO_2$ to $Na_2O$ is 2:1, that is to say alkali silicates which are far richer in alkali than commercial water-glass, in which the ratio of $SiO_2$ to $Na_2O$ is 3:1 to 3.5:1, are known. In these cement powders an excess of constituents capable of reacting with alkalies has already been used in order to render the cement made therefrom resistant to water.

By this invention, however, it is possible to obtain water- and acid-proof cements when a pulverulent water-glass is used in which the ratio of $SiO_2$ to alkali oxide is greater than 2.0:1, preferably 3:1 to 3.5:1, by adding to the constituents an amount of substance capable of reacting with alkalies which exceeds the quantity necessary for neutralizing the alkali present in the water-glass. The advantage of this mode of working resides in the fact that, owing to the possibility of using water-glass of any desired composition, it is not necessary to use a water-glass containing much alkali oxide; and thus an increase of the soluble constituent, i. e. the compound formed by interaction of the substance capable of reacting with alkalies and the alkali oxide of the water-glass, in the cement is avoided.

On the other hand the neutralization of commercial water-glasses which are relatively rich in silicic acid requires, of course, relatively smaller amounts of substances capable of reacting with alkalies (for instance silicofluorides). In case silicofluoride is used, the low content of substance reacting with alkalies has the advantage that, even though an excess of such substance is used, the content of fluorine in the finished cement will not be very high, which is of special advantage in the case of cements that come into contact with sulfuric acid since then the presence of large quantities of fluorine in the cement is injurious. The decrease of the content of fluorine according to this invention, therefore, is of great industrial importance.

The new process may be varied in such a manner that part of the water-glass necessary is mixed from the first with the cement powder in a solid form and the rest added in the dissolved state in making-up the cement.

The following examples serve to illustrate the invention, but they are not intended to limit it thereto; the parts are by weight:

1. A cement powder of the following composition is mixed with water so as to form a mortar:

|   | Parts |
|---|---|
| Sodium water-glass powder containing about 20% of $Na_2O$, 60% of $SiO_2$ and 20% of $H_2O$ | 20 |
| Silicofluoride | 8.5 |
| Clay | 1.5 |
| Quartz powder | 70 |

[The fineness of grinding depends on the intended use; for example, for making narrow joints it must be finer than for making wider joints.]

2. A cement powder of the following composition is used for mixing with water:

|   | Parts |
|---|---|
| Potassium water-glass powder containing $SiO_2$ and $K_2O$ in a ratio of 2.5 to 1 and 25 per cent of water | 25 |
| Potassium silicofluoride | 12 |
| Clay | 3 |
| Quartz powder | 60 |

I claim:

1. The process of preparing a water-glass cement resistant to water and acids from a cement powder which comprises mixing water with a cement powder which contains pulverulent water-glass, an acid resisting filling agent and a substance capable of reacting with alkali, the pulverulent water-glass having a ratio of $SiO_2$ to alkali oxide exceeding 2:1 and there being present in the cement powder a large excess of the substance capable of reacting with alkali over the quantity necessary for neutralizing the alkali in the water-glass used.

2. The process of preparing a water-glass cement resistant to water and acids from a cement powder which comprises mixing water with a cement powder which contains pulverulent water-glass, an acid resisting filling agent and a substance capable of reacting with alkali, the pulverulent water-glass having a ratio of $SiO_2$ to alkali oxide of 3:1 to 3.5:1 and there being present in the cement powder a large excess of the substance capable of reacting with alkali over the quantity necessary for neutralizing the alkali in the water-glass used.

3. The process of preparing a water-glass cement resistant to water and acids from a cement powder which comprises mixing water with a cement powder which contains pulverulent water-glass, an acid resisting filling agent and a substance capable of reacting with alkali, the pulverulent water-glass having a ratio of $SiO_2$ to alkali oxide exceeding 2:1 and there being present in the cement powder an excess of at least 25 per cent of the substance capable of reacting with alkali over the quantity necessary for neutralizing the alkali in the water-glass used.

4. The process of preparing a water-glass cement resistant to water and acids from cement powders which comprises mixing water with a cement powder which contains pulverulent water-glass, an acid resisting filling agent and a substance capable of reacting with alkali, the pulverulent water-glass having a ratio of $SiO_2$ to alkali oxide of 3:1 to 3.5:1 and there being present in the cement powder an excess of at least 25 per cent of the substance capable of reacting with alkali over the quantity necessary for neutralizing the alkali in the water-glass used.

5. The process of preparing a water-glass cement resistant to water and acids from a cement powder which comprises mixing a liquid water-glass solution with a cement powder which contains pulverulent water-glass, an acid resisting filling agent and a substance capable of reacting with alkali, the pulverulent water-glass having a ratio of $SiO_2$ to alkali oxide exceeding 2:1 and there being present in the cement powder a large excess of the substance capable of reacting with alkali over the quantity necessary for neutralizing the whole alkali in the water-glass used.

6. The process of preparing a water-glass cement resistant to water and acids from a cement powder which comprises mixing a liquid water-glass solution with a cement powder which contains pulverulent water-glass, an acid resisting filling agent and a substance capable of reacting with alkali, the pulverulent water-glass having a ratio of $SiO_2$ to alkali oxide exceeding 2:1 and there being present in the cement powder an excess of at least 25 per cent of the substance capable of reacting with alkali over the quantity necessary for neutralizing the whole alkali in the water-glass used.

7. The process of preparing a water-glass cement resistant to water and acids from cement powders which comprises mixing a liquid water-glass solution with a cement powder which contains pulverulent water-glass, an acid resisting filling agent and a substance capable of reacting with alkali, the pulverulent water-glass having a ratio of $SiO_2$ to alkali oxide of 3:1 to 3.5:1 and there being present in the cement powder an excess of at least 25 per cent of the substance capable of reacting with alkali over the quantity necessary for neutralizing the whole alkali in the water-glass used.

8. A cement powder for the preparation of an acid-proof and water-proof cementation comprising a mixture of pulverulent water-glass, an acid resisting filling agent and a substance capable of reacting with alkali, the ratio of $SiO_2$ to alkali oxide exceeding 2:1 and the substance capable of reacting with alkali being used in a large excess over the quantity necessary for neutralizing the alkali in the water-glass used.

9. A cement powder for the preparation of an acid-proof and water-proof cementation comprising a mixture of pulverulent water-glass, an acid resisting filling agent and a substance capable of reacting with alkali, the ratio of $SiO_2$ to alkali oxide exceeding 2:1 and the substance capable of reacting with alkali being used in an excess of at least 25 per cent over the quantity necessary for neutralizing the alkali in the water-glass used.

10. A cement powder for the preparation of an acid-proof and water-proof cementation comprising a mixture of pulverulent water-glass, an acid resisting filling agent and a substance capable of reacting with alkali, the ratio of $SiO_2$ to alkali oxide being 3:1 to 3.5:1 and the substance capable of reacting with alkali being used in an excess of at least 25 per cent over the quantity necessary for neutralizing the alkali in the water-glass used.

KARL DIETZ.